Patented Oct. 21, 1952

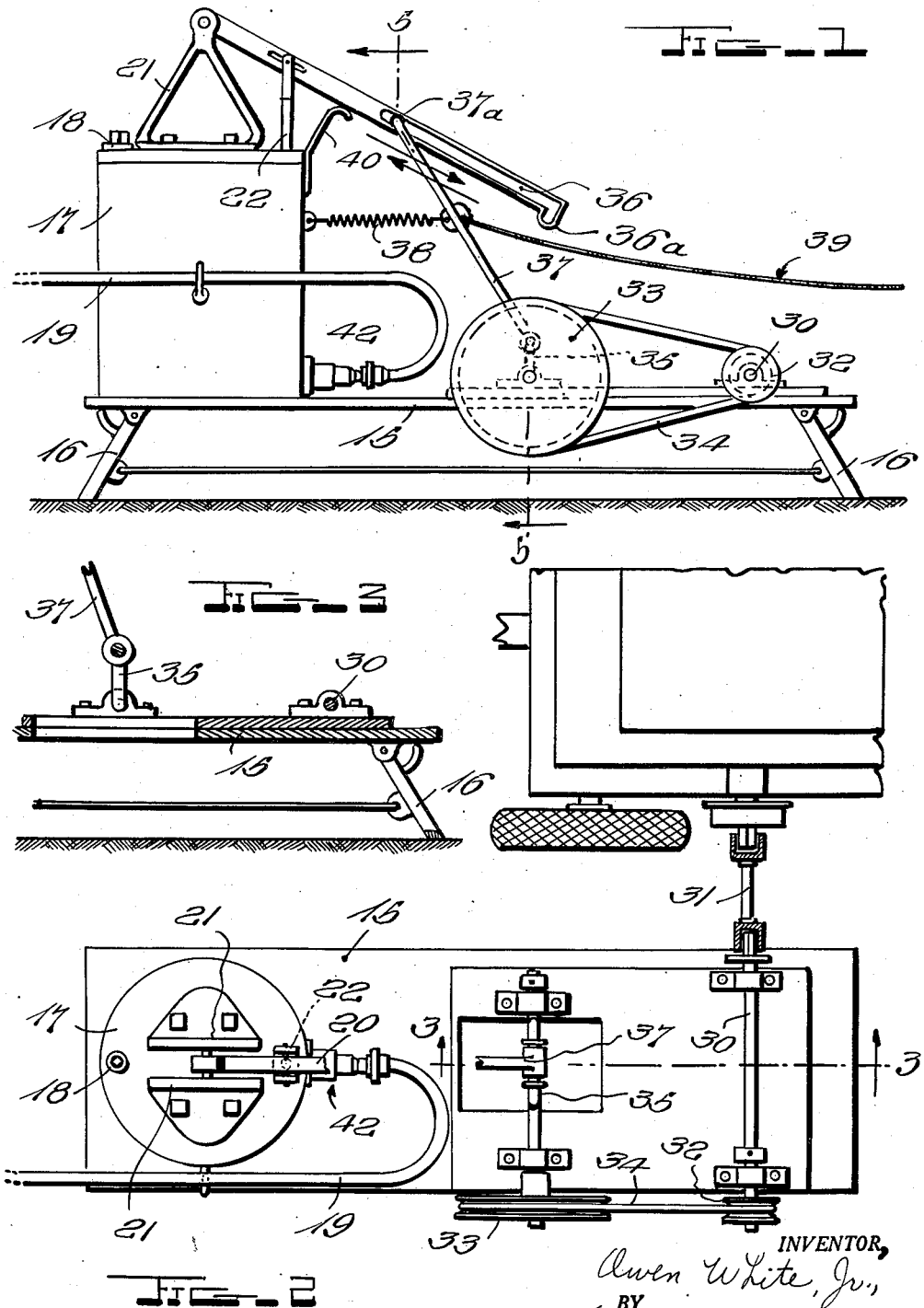

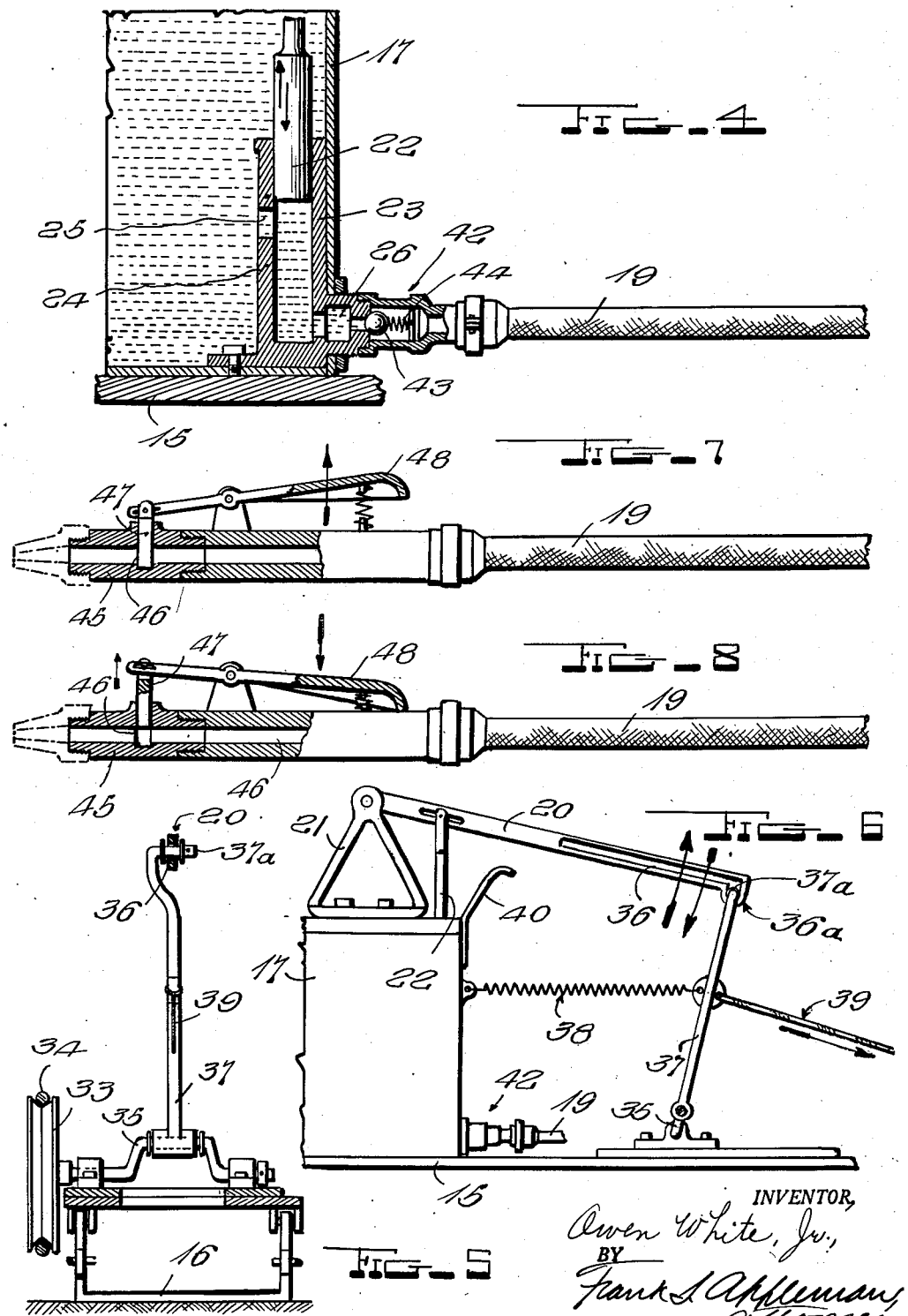

2,614,731

UNITED STATES PATENT OFFICE 2,614,731

POWER-DRIVEN LUBRICATING APPARATUS

Owen White, Jr., Sibley, Iowa

Application April 25, 1947, Serial No. 743,852

2 Claims. (Cl. 222—333)

This invention relates to improvements in power driven lubricating apparatus, and has particular relation to structures of this type designed for service in lubricating, as by greasing, the bearings, etc. of modern machinery, and more particularly machinery, utilized by farmers, such as corn pickers, combines, cotton pickers and the like.

While the invention is capable of service in other machinery fields where bearings are utilized, it is designed more particularly for use in connection with farming apparatus of the type indicated. Farming implements of this general type generally include many bearings of different forms, and since the implements are generally used at points away from service station activities, it has generally been necessary that the required lubrication be provided by hand operation, since the cost of equipping and maintaining a modern service station at the farm would not be warranted by the amount of service which the individual farmer might require, while the loss of time which would be present in attempting to move the implements to an established service station, would also be unwarranted. Hence, the normal practice is to provide the lubricating or greasing operations by hand, an operation which is not only time-consuming in attempting to provide efficient service, but also laborious, since there must be a constant manipulation of the hand device in order to provide the pressures needed in introducing the lubricant to the bearing.

The present invention has been developed with a view to meeting conditions such as these by providing a power driven device and assembly which will provide for efficient service "in the field" or other point, with the service such as to provide the lubrication in an efficient manner with little or no manual labor required, and by means of which the lubrication can be completed in a reduced time period, and at the same time be a structure and assembly which can be marketed at a reasonably low cost of manufacture.

Specifically, the invention embodies a container for the lubricant, this being mounted upon a support which is partially collapsible so as to permit no only of ready transportation, but to be located at a point readily accessible to a power source which may be the power source of the particular implement which is to be lubricated; the support carries a pumping structure capable of being rendered active and inactive in simple manner, with the pumping structure operated by a suitable power translating mechanism adapted to be operatively connected up to the power source; the pump structure, when active, is adapted to pump the lubricant from the container into a flexible connection of considerable length and which carries means for controlling the movement of the lubricant therethrough, thus enabling the user to carry the free end of the flexible carrier to the various points where he desires to provide the lubrication, the flexibility of the carrier permitting this to be done without requiring a change in position of the support and making possible lubricating action at various locations as required by the implement structure; the assembly also includes a means by which the user can render the pump structure active and inactive at will while located at such remote points, the user having a flexible connection with the pumping structure such as will enable him to render the latter active at will, means being provided for automatically rendering the pump structure inactive excepting when the user is maintaining the structure active. In this manner, the user is able to readily lubricate the various bearings, etc. of the implement, regardless of their specific location and without the necessity of shifting his pumping assembly and yet have control of the operation of the structure at will; hence, the user is able to center his attention directly upon the point of lubrication during such lubricating activity, thereby assuring more efficient lubricating action, as well as reduction in time length of the lubrication, since his individual control of the activity of the pump structure enables him to control the time length and character of the lubricating action directly from the point where that action is being taken.

To these and other ends, therefore, the nature of which will be more fully pointed out as the invention is hereinafter disclosed, said invention consists in the improved constructions and combinations of parts as more particularly described hereinafter, illustrated in the accompanying drawings, and more particularly pointed out in the appended claims.

In the accompanying drawings, in which similar reference characters indicate similar parts in each of the views—

Figure 1 is a side elevation of an assembly according to the present invention, the parts being shown in the position in which the power source is active but the device is inactive for dispensing the lubricant;

Figure 2 is a plan view of portions of the mechanism and showing the same connected up to a power supply source;

Figure 3 is a detailed sectional view taken on line 3—3 of Fig. 2;

Figure 4 is an enlarged detail sectional view of the outlet zone from the tank, the inner end of the dispensing hose being shown as positioned relative thereto, the lower end of the plunger being shown in raised position;

Figure 5 is a cross sectional view taken on line 5—5 of Fig. 1;

Figure 6 is a view in elevation showing the operating connections between the crank shaft and oscillating arm, the parts being shown in active position;

Figure 7 is an enlarged view, partly in section and partly in elevation, showing the nozzle zone of a dispensing tube, the view illustrating the parts in position for closing the dispensing channel;

Figure 8 is a view similar to Fig. 7 with the parts shown in position with the dispensing channel opened for the delivery of lubricant.

In the drawings, which disclose a preferred form of the invention, 15 indicates a support upon which the various features of the invention are mounted. The support has somewhat of the characteristics of a collapsible table of the elongated type, being equipped with legs 16 which may be folded in a desired direction so as to economize space, various ways in which such structure may be provided being well known, the purpose being to permit economizing in space for purposes of transportation, but permitting of location at a desired point, properly supported, and having the table top raised a desired distance from the surface of the ground or other supporting surface.

Mounted upon the upper surface of the support and preferably in an end zone thereof, is a vertically elongated tank 17 of desired dimensions, the tank being designed to contain the lubricant which is to be used in the lubrication of the bearings and the like. The tank 17 is preferably closed at its top and provided with a filling opening 18. The tank is designed to permit dispensing of the lubricant therefrom by the use of a suitable pumping structure designed to be power operated; various forms of pumps may be utilized for the purpose, but, for the purpose of providing for low cost formations, the particular form shown and now described, is preferred, this particular form serving to discharge the lubricant from the lower end of the tank into a hose section 19 of desired length and which provides for ready movement of the user to reach the bearings, without requiring change in position of the support and tank.

The particular form of pump shown is in the form of an operating arm or handle 20 which is pivotally supported at one end by a pair of brackets 21 carried by the top of the tank, the mounting being of any preferred type. Pivotally connected to the handle or arm 20 and at an intermediate point in the length thereof is a depending plunger 22, the lower end of which is adapted to extend into a vertically extending opening or chamber 23 formed in a member 24 located internally and in the lower zone of the tank, and preferably adjacent a side wall, the lower end of the plunger being designed to have a working fit within opening or chamber 23. Member 24 is provided with a lateral opening 25 which connects the interior of chamber 23 with the interior of the tank and permits the lubricant to pass from the tank into the chamber 23 when the lower end of the plunger is raised to a point above opening 25. Member 24 also carries in its lower zone a lateral opening 26 leading from the bottom of chamber 23 outwardly of the tank and is designed to provide communication between chamber 23 and the dispensing structure which is presently described in detail, and which may be exemplified by the flexible dispensing connection 19.

As will be understood, if the handle or arm 20 be rocked on its pivot, it will serve to raise or lower plunger 22, thus causing the lower end zone of the plunger to traverse chamber 23. When such lower end zone is above the opening 25, the lubricant can pass from the tank into chamber 23 below the lower end of the plunger. Hence, if the arm 20 then be rocked in the opposite direction, with the chamber 23 filled with the lubricant, it will be apparent that as the lower end of the plunger moves downwardly below the position of opening 25, it will then force the lubricant content located in chamber 23 below opening 25 outwardly through opening 26 and thus into the dispensing channel. The specific volume of lubricant thus discharged by the downward movement of the plunger is comparatively small—being the amount within chamber 23; but if the arm be oscillated a sufficient number of times, the amount of lubricant thus dispensed will be ample for the service.

The handle or arm 20 projects in the direction of length of support 15 and laterally of the tank so as to place the free end of the arm outside of the vertical planes of the tank and in overlying relation to other portions of the support which carry the mechanism for operating the arm to produce the reciprocation of the plunger 22.

The operating mechanism is in the form of a shaft 30 extending transversely of the support and near one end thereof, said shaft having one end zone equipped with an adapter or adjustable extension 31 beyond the side of the support, the adapter having its free end so arranged as to permit its ready connection with the power source of the implement to be treated; in other words, the adapter 31 is of a type which can be readily applied to the take-off that is usually found as a part of such implements, especially where the latter is adapted to form the power source for the operation of other mechanisms.

Shaft 30 carries a pulley 32 beyond the opposite side of support 15, pulley 32 being operatively connected with a larger pulley 33 located on the support in a zone below the projecting end of the arm 20, the two pulleys being connected by a suitable drive belt 34. Pulley 33 is designed to operate a crank arm 35 which extends transversely of the support, the crank of the arm being rotated in a circular path by the rotation of pulley 33, with the latter being driven through pulley 32 from the power source of the implement.

The arm 20 is formed with an elongated slot 36 extending in the direction of length of the arm and of the proper length, the outer end of slot 36 being formed with an offset or enlarged portion 36a. Slot 36 or its equivalent can be provided in any suitable manner within the handle or arm 20, and is designed to be operatively connected with the crank 35 by a connecting rod 37, one end of which is mounted upon crank 35 with the opposite end in the form of a wrist pin 37a which is designed to extend laterally through slot 36 (the connection between rod 37 and the handle portion carrying the slot 36 may be indicated as a slide for the wrist pin); the wrist pin 37a is secured in position by the use of washers or the like and in such manner that the pin can move lengthwise of the slot unless its movement is restrained, as presently described. A spring 38 extends between the tank 17 and the rod 37 so that the wrist pin will be normally held in an inner zone of the slot 36 and in position for free travel lengthwise of the slot through the tension of the spring 38; if, however, the rod be drawn in the opposite direction in opposition to the tension of spring 38, the wrist pin will move into the outer end zone of the slot and into enlargement 36a, with the wrist pin within the enlargement, and with the rod maintained under such drawn condition, rotation of the crank arm will cause the free end of the arm 20 to rock on its pivot as the crank arm moves through its circular path, the wrist pin remaining within the enlargement and outer end zone as long as the drawn condition is maintained, this movement serving to oscillate the arm 20 and provide the reciprocating movements of the plunger 22. However, when the wrist pin is being held by the tension of spring 38, the crank arm rotation causes the pin 37a to travel lengthwise of the slot between the inner and outer end zones of the slot.

This control of the position of rod 37 and wrist pin 37a within the slot 36 is placed under the control of the operator by the use of a line 39 which is secured to rod 37 in the vicinity of the connection of spring 38 with such rod, line 39 being of a desired length—preferably substantially equal to the length of the hose section 19—with the free end of the line being designed to be carried by the operator; unless the line is actually drawn by the operator, spring 38 is active to move the wrist pin end of the rod in the direction of its inner position, thus placing the wrist pin in such position that the lower end of the rod 37 can traverse the path described by the crank 35, the wrist pin 37a simply moving in the direction of length of the slot, the tension of the spring on rod 37 serving to rock the arm 20 downwardly on its pivot to bring the arm into contact with a stop fixture 40 carried by the tank and which limits the downward movement of the arm, the spring retaining the arm in such position during periods when the crank shaft is rotating in the absence of line drawing pressure, the wrist pin simply idling within the slot or slide 36 as the crank arm rotates. From this, it will be understood that the pumping action is under complete control of the operator, through the fact that he is able to retain the wrist pin at the outer end of the slot by simply drawing on line 39 until the wrist pin end of rod 37 reaches this end of the slot; hence, by continuing this pulling action, the wrist pin is maintained in this position of the slot, so that the arm is then subject to the rotative action of the crank arm applied to the outer end of arm 20 through the connecting rod 37 and wrist pin 37a with the latter located at the outer end of slot 36. Obviously, the operator simply releases the line when he desires to end the pumping action, although the crank arm may continue its rotation as before. In this way, the pumping operation is always under the control of the operator who maintains the pulling stress on the line as long as he wishes pumping action to continue, release of the line rendering spring 38 active to automatically shift the parts so that the wrist pin may idle within slot 36 until the succeeding operation is to be provided.

The actual dispensing portion of the invention is in the form of a flexible tubular section such as hose 19, this being removably secured to the fitting carried by the tank and which contains the opening 26, the fitting—indicated at 42—being arranged with a seat with which a ball 43, supported by a spring 44, cooperates, the ball being designed to serve as a check valve within opening 26, its purpose being to prevent return of lubricant from the hose during periods when plunger 22 is being raised, the ball permitting passage of the lubricant into the hose during downward movement of the plunger.

The hose 19—like the line 39—is of a length such as will enable the operator to carry the free end to the various bearing structures being lubricated; a convenient length of the line and hose could be indicated as ten feet. The free end of the hose 19 is provided with a fitting 45 to which any suitable nozzle may be applied, and, adjacent to such fitting, the hose is provided with a suitable control device capable of controlling the passage of lubricant from the body of the hose into the nozzle. The control structure may be of any preferred form, a simple arrangement being indicated on the drawings in the form of a laterally extending opening within the hose reaching to the passageway for the lubricant, with such opening, indicated at 46, being designed to receive a plunger 47 carried by a pivoted arm 48 mounted on the hose, arm 48 being supported by a spring 49 which tends to normally move plunger 47 into intersecting relation to the lubricant passageway and thus shut off the supply.

When the operator desires to lubricate a particular bearing, he brings the ends of line 39 and hose 19 to the vicinity of the selected bearing, retaining the line in one hand and the nozzle end of the hose in the other hand; when he is ready for applying the lubricant, the operator draws upon the line 39 to shift rod 37 to its active position at the outer end of the slot 36—retaining the line taut during the lubricating period—and at the same time presses downward upon the arm 48, thus opening the lubricant passage to the nozzle zone of the hose, arm 48 being in convenient position to permit this action by the operator and at the same time direct the nozzle. When the bearing has been lubricated, arm 48 is released and at the same time the line 39 is released, permitting spring 38 to shift rod 37 to its idling zone within the slot 36.

While the above description is directed to the use of the apparatus in connection with "in the field service," it is apparent that the apparatus is applicable for use in other connections, as for instance, an equipment for use in garage service. In such case, the apparatus would be permanently positioned, and the power source would preferably be in the form of a small motor, which could be readily applied and made operative relative to shaft 30—the motor could be carried by the support. The use in other fields is more or less apparent, the apparatus being usable under conditions where lubricating is desired at a plurality of points in a small zone, such as the lubrication of machines; it being apparent that where the machine to be treated is so extensive as to be beyond the range of the line and dispensing section, the apparatus can be readily shifted to another zone to repeat the lubrication required within the range of line and hose.

In other words, the apparatus assembly is of a type such as will permit of lubrication action within a zone of considerable extent without change in the position of the support while, at the same time, the assembly is of such type that it can be bodily transported from one point to another and thus meet the conditions where the service is required in a zone of greater amplitude than that which is permitted by the flexible line and flexible hose.

The assembly is one which can be produced at a comparatively low cost, and is operative with various forms of lubricant. Due to the fact that the assembly is such as to permit complete control from the end zone of a flexible line and hose, makes the assembly one which is especially adapted for the purposes indicated, and an assembly such that its cost will be warranted for "in the field" service.

While I have herein disclosed a preferred form of apparatus assembly, and explained the manner of its use and service, it will be apparent that changes and/or modifications therein may be found essential in meeting the exigencies of service and/or the desires of a user, and I therefore reserve the right to make any and all such changes and/or modifications as may be found desirable and/or essential, insofar as the same may fall within the spirit and scope of the invention as expressed in the accompanying claims, when broadly construed.

I claim:

1. In a portable power driven apparatus for dispensing lubricants, a lubricant supply tank, a flexible carried conduit operatively connected with the tank, plunger means reciprocable within the tank for forcing the lubricant into the carrier conduit, and movement imparting means for the plunger means, said movement imparting means comprising an arm pivotally supported by the tank, a pivotal connection between said arm and the plunger means, a power source, a rotatable crank shaft driven by said power source, a rod operatively connected to said rotatable crank shaft said pivotally mounted arm having a longitudinal slot therein, a member on said rod extending through and movable in the slot, means to hold said member against the end of the slot remote from the pivotal connection between the arm and the plunger means whereby rotation of said crank shaft reciprocates said plunger means, and spring means operatively connected with said tank and rod to urge said member towards the opposite end of the slot when the holding means is inactive to prevent reciprocation of the plunger means during rotation of the crank shaft.

2. An apparatus as claimed in claim 1 wherein said means to hold the member against the end of the slot includes an angular offset merging with said end of the slot, and a flexible element attached to said rod for moving the rod against the action of the spring means to lodge the member in said angular offset.

OWEN WHITE, Jr.

REFERENCES CITED

The following references are of record in the file of this patent:

UNITED STATES PATENTS

| Number | Name | Date |
|---|---|---|
| 1,282,890 | Livingston | Oct. 29, 1918 |
| 1,528,366 | Correa | Mar. 3, 1925 |
| 1,648,554 | Lundin | Nov. 8, 1927 |
| 1,781,045 | Bacher | Nov. 11, 1930 |
| 1,858,155 | Harris | May 10, 1932 |
| 2,047,414 | Henry | July 14, 1936 |
| 2,431,534 | Benner | Nov. 25, 1947 |